US006384152B2

(12) United States Patent
Smith et al.

(10) Patent No.: US 6,384,152 B2
(45) **Date of Patent: *May 7, 2002**

(54) INSULATING RESIN OF EPOXY RESIN, EPOXY DILUENT, PHENOLIC ACCELERATOR AND ORGANOTIN CATALYST

(75) Inventors: James D. B. Smith, Monroeville, PA (US); Franklin T. Emery, Fort Payne, AL (US)

(73) Assignee: Siemens Westinghouse Power Corporation, Orlando, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,977

(22) Filed: Jul. 19, 1999

(51) Int. Cl.[7] ........................ C08L 63/00; C08L 63/02; C08L 63/04; H01F 27/02

(52) U.S. Cl. .......................... 525/524; 525/481; 336/90

(58) Field of Search ................................ 525/481, 524; 336/90

(56) References Cited

U.S. PATENT DOCUMENTS

| | | | | |
|---|---|---|---|---|
| 3,716,598 A | | 2/1973 | Markovitz | |
| 4,020,017 A | | 4/1977 | Smith et al. | |
| 4,112,183 A | | 9/1978 | Smith | |
| 4,160,178 A | * | 7/1979 | Smith et al. | 310/43 |
| 4,241,101 A | * | 12/1980 | Saunders et al. | 523/403 |
| 4,296,018 A | | 10/1981 | Smith et al. | |
| 4,356,417 A | | 10/1982 | Smith et al. | |

FOREIGN PATENT DOCUMENTS

| | | | |
|---|---|---|---|
| GB | 971525 | * | 9/1964 |
| GB | 1055573 | | 1/1967 |
| JP | 62-45616 | * | 2/1987 |
| JP | 62-45616 A | * | 2/1987 |
| JP | 62-45616 | | 7/1987 |

* cited by examiner

*Primary Examiner*—Robert E. L. Sellers

(57) ABSTRACT

An insulating resin is made containing an epoxy system of epoxy resin: and an epoxy diluent, with a phenolic accelerator selected from catechol or pyrogallol and an organotin latent catalyst selected from triphenyltin chloride, tribenzyltin chloride, tribenzyltin hydroxide or triphenyltin acetate. The insulating resin is solventless and has a viscosity of from 10 centipoise to 450 centipoise at 25° C. for up to eight weeks and can be used as an impregnating resin in slot portions (15) and 16of an electrical coil (10), usually in combination with mica tape, in a motor (20) or a generator (30).

4 Claims, 1 Drawing Sheet

INSULATING RESIN OF EPOXY RESIN, EPOXY DILUENT, PHENOLIC ACCELERATOR AND ORGANOTIN CATALYST

BACKGROUND OF THE INVENTION

1. Field of the Invention

This invention relates to new and improved epoxide insulating resins, which utilize a combination of selected phenol accelerators and selected organotin latent catalysts, and which are non volatile, solventless and cold-blendable and also have low viscosity and long storage life.

2. Background Information

Organotin catalysts are well known in the insulating resin art as latent catalysts for epoxy resins, for example, U.S. Pat. Nos. 4,020,017 and 4,112,183 (Smith et al. and Smith), taught epoxy compositions containing organotin compounds with chlorine, hydroxide, acetate, butyrate, propionate or dimethylphosphate, as well as phenyl, naphthyl, Br or $NO_2$ substituted aryl, and benzyl groups, among others, as components, and listed twenty nine preferred compounds. Smith et al., '017, specifically excluded phenolic; anhydride or amine compounds from the epoxy, and utilized reactive diluents containing 1, 2 epoxy groups. Smith, '183, required use of a solvent such as a ketone or aromatic hydrocarbon, preferably a dual solvent system, which had to be removed by heating at over 65° C. (149° F.), and lists about twenty six preferred organotin catalysts.

In U.S. Pat. Nos. 4,296,018 and 4,356,417 (both Smith et al.) the phenols catechol, $C_6H_4(OH)_2$, and pyrogallol, $C_6H_3(OH)_3$ were used with epoxy resins and organotin compounds, but both teachings required use of a solvent such as a ketone or aromatic hydrocarbon, preferably a dual solvent system, which had to be removed by heating at over 85° C. (185° F.). Both of these patents list seventeen preferred organotin compounds, and specifically exclude anhydride, amine, phenol or amide curing agents.

U.S. Pat. No. 3,716,598 (Markovitz) taught control of the cure rate of epoxy resins by use of specific bis(triorganotin) oxides, and from 0.1 to 15 wt. %, based on total epoxy resin system, of a phenolic accelerator, such as pyrogallol, hydroxy-benzaldehydes, catechol, resorcinol and hydroquinone, among others. The bis(triorganotin) oxide had the formula: $(R_1)_3Sn—O—Sn(R_2)_3$, where R was an alkyl, cycloalkyl, aryl, or alkaryl group. One preferred material was bis(tri-n-butyltin) oxide.

While all of these resinous epoxy insulating compositions each have their own advantages, what is still needed is a resinous system having a unique cure system that provides: (1) a solventless, cold-blendable resin admixture not requiring volatile and flammable monomers such as styrene or vinyl toluene (2) a low viscosity resin (below about 120 centipoise at 25° C.) suitable for vacuum pressure impregnation ("VPI" in high voltage insulation for coils of motors and generators (3) a resin compatible with mica tape, and importantly, (4) a resin which has a long storage life and that does not require special equipment or pre-cooking, and which uses raw material components readily commercially available world-wide.

SUMMARY OF THE INVENTION

Therefore, it is one of the main objects of this invention to provide a high voltage capable insulating resin that can be manufactured with ease in almost any country without highly specially trained personnel or expensive oven equipment, and which, during manufacture, would have minimum emission health problems.

It is another main object of this invention to provide a solventless, cold-blendable, low viscosity insulating resin that can be used to impregnate mica tape in motor and generator coils.

These and other objects of the invention are accomplished by providing an insulating resin consisting essentially of: an epoxy system having an epoxy resin component and an epoxy reactive diluent having 1,2 epoxy groups in its chain structure; a phenolic accelerator selected from the group consisting of catechol, pyrogallol and mixtures thereof; and an organotin latent catalyst selected from the group consisting of triphenyltin chloride, tribenzyltin chloride, tribenzyltin hydroxide, triphenyltin acetate and mixtures thereof, where the insulating resin is solventless and has a viscosity of from 10 centipoise to 150 centipoise at 25° C.

This means that the viscosity at 25° C. will remain below 450 cps. for at least eight weeks. The insulating impregnating resin can be cold-blended at from 20° C. to 35° C. Preferably the epoxy resin component will be a cycloaliphatic epoxy resin or a blend of cycloaliphatic epoxy resin plus other type epoxy resins where the cycloaliphatic epoxy constitutes at least 50 wt. % of the blend. The preferred reactive diluent is the diglycidyl ether of neopentyl glycol. In all cases both cycloaliphatic epoxy and epoxy reactive diluent will be present in the epoxy system.

Preferably the reactive diluent will constitute from 30 wt. % to 70 wt. % of the epoxy system, the phenolic accelerator component concentration will range from 0.001 wt. % to 0.4 wt. %, preferably from 0.01 wt. % to 0.4 wt. %, of the insulating resin, based on the total weight of the epoxy system (epoxy resin component and reactive diluent). The organotin component concentration will range from 0.01 wt. % to 0.1 wt. %, preferably from 0.05 wt. % to 0.1 wt. %, of the insulating resin, based on the total weight of the epoxy system. Both the selected phenolic accelerator and the organotin catalyst must be present in the insulating resin.

These insulating resins have a long storage stability at 25° C. of over about 4 months, and can be used to pot or encapsulate electrical components or to impregnate mica or glass tape used on coils for electrical machines, such as motors or generators. Where a "medium viscosity" resin ranges from about 16,000 cps. to 20,000 cps., these ultra low viscosity resins (up to 450 cps. for eight weeks at 25° C.) have excellent penetration ability and are excellent impregnating resins even after substantial storage. These resins are extremely easy to manufacture, utilizing a cold blending admixture of ingredients and not requiring a hot flash step for solvent removal, with attendant venting problems.

BRIEF DESCRIPTION OF THE DRAWINGS

For a better understanding of the invention, reference may be made to the preferred embodiments, exemplary for the invention, shown in the accompanying drawings, in which.

DESCRIPTION OF THE PREFERRED EMBODIMENTS

Figure 1:
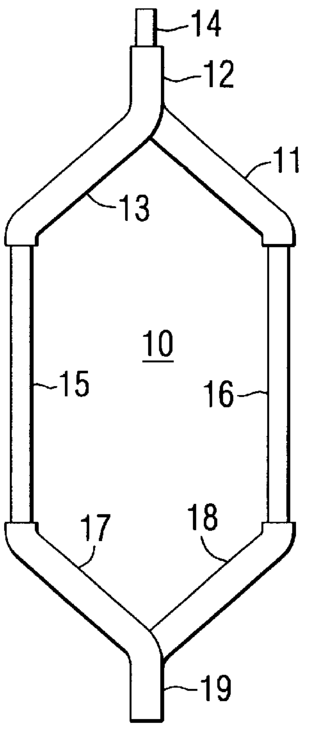
FIG. 1 is a plan view of a closed electrical coil member having two slot portions.

Throughout the specification the terms "epoxy" and "epoxide" are interchangeable. The preferred epoxy, or epoxide, resin used in the epoxy resin component of this invention is a cycloaliphatic type, selected from non-glycidyl ether epoxides containing more than one 1,2 epoxy group per molecule. These are well known in the art and are generally prepared by epoxidizing unsaturated aromatic hydrocarbon compounds, such as cyclo-olefins, using hydrogen peroxide or peracids such as peracetic acid and perbenzoic acid. The organic peracids are generally prepared by reacting hydrogen peroxide and either carboxylic acids, acid chlorides, or ketones, to give the compound R—COOOH.

Such non-glycidyl ether cycloaliphatic epoxides are here characterized by the absence of the ether oxygen bond, i.e. —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides.

Examples of non-glycidyl ether cycloaliphatic epoxides would include 3,4-epoxycyclohexylmethyl-3,4- epoxycyclohexane carboxylate (containing two epoxide groups which are part of ring structures, and an ester linkage); vinyl cyclohexene dioxide (containing two epoxide groups, one of which is part of a ring structure); 3,4-epoxy-6-methylcyclohexyl methyl-3,4-epoxy-6-methylcyclohexane carboxylate and dicyclopentadiene, having the following respective structures:

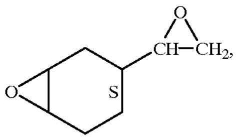

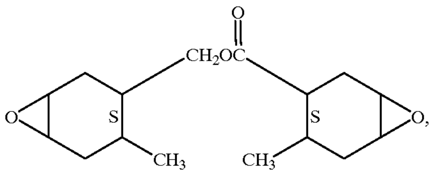

and

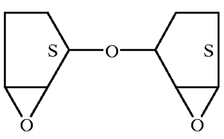

Other useful cycloaliphatic epoxides include 2-(3,4-epoxycyclohexyl-5,5-spiro-3,4-epoxy) cyclohexanemetadioxane and 3,4-epoxy-6-methylcyclohexyl-methyl adipate.

A distinguishing feature of many of the non-glycidyl ether cycloaliphatic epoxides is the location of the epoxy group(s) on a ring structure rather than on an aliphatic side chain. Generally, the cycloaliphatic epoxide particularly useful in this invention will have the formula selected from the group consisting of:

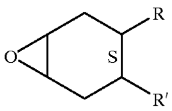

and

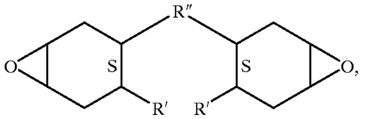

where S stands for a saturated ring structure, R is selected from the group consisting of $CHOCH_2$, $O(CH_2)_nCHOCH_2$ and $OC(CH_3)_2CHOCH_2$ radicals where n=1 to 5, R' is selected from the group consisting of hydrogen, methyl, ethyl, propyl, butyl and benzyl radicals and R" is selected from the group consisting of $CH_2OOC$, and $CH_2OOC(CH_2)_4COO$ radicals.

Use of an epoxy reactive diluent having 1,2 epoxy groups in its chain structure is particularly advantageous in combination with the above described cycloaliphatic resins. Useful reactive epoxy diluents include diglycidyl ethers of a glycol having from 3–12 carbon atoms between the glycidyl ether units, that is, 3–12 carbons in the glycol unit, for example, diglycidylether of neopentyl glycol ("DGENPG"), and diglycidylether of 1,4 butanediol. Below 3 carbons in the glycol unit and effective complexing would not take place with the orgono-tin compound. Other useful reactive diluents include epoxidized oils made from triesters of glycerol and long chain unsaturated acids. The number of epoxy groups per chain will vary, but for epoxidized oils such as modified soybean oils there are an average of about 4 per chain and for epoxidized linseed oils there are an average of about 6 per chain. The epoxidized natural oils should have from about 3 to 12% by weight oxirane (epoxy) oxygen content.

DGENPG is the preferred reactive diluent. DGENPG has two 1,2 epoxy groups and is prepared by a two step process. The initial step reacts neopentyl glycol and epichlorohydrin in the presence of $BF_3$ to produce a chlorohydrid intermediate which is then dehydrohalogenated by sodium hydroxide or sodium aluminate to provide:

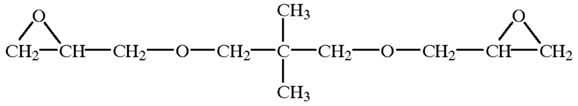

(DPENPG)

These reactive diluents can be used in the range of 30 wt. % to 70 wt. % of the epoxy system weight. That is, if 100 parts by weight of combined epoxy resin component plus reactive diluent is used, 30 to 70 parts by weight of reactive diluent can be used in that system. These reactive diluents as well as the cycloaliphatic epoxy resins described are well known, and taught for example in the Smith et al. '017 patent.

Other types of epoxy, or epoxide, resin can be used as the epoxy resin component in this invention, with the previously described reactive diluents. One type of epoxy resin which may be used is obtainable by reacting epichlorohydrin with a dihydric phenol an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

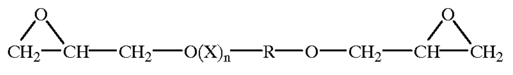

where X is, for example R—O—$CH_2$—CHOH—$CH_2$—O, where n is an integer of the series 0, 1, 2, 3 . . . , and R represents the divalent hydrocarbon radical of the dihydric phenol. Typically R is:

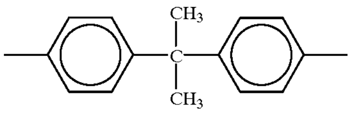

to provide a diglycidyl ether of bisphenol A type expoxide or

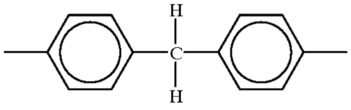

to provide a diglycidyl ether of bisphenol F type epoxide resin.

The bisphenol epoxides used in the invention have a 1, 2 epoxy equivalency greater than one. They will generally be diepoxides. By the epoxy equivalency, reference is made to the average number of 1, 2 epoxy groups:

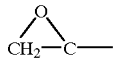

Other glycidylether resins that are useful in this invention include polyglycidylethers of a novolac. These resins are prepared by reacting an epihalohydrin with phenol formaldehyde condensates, which the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins. The product of the reaction is generally a massive oxidation resistant aromatic compound.

Although epoxy novolac resins from formaldehyde are generally the preferred novolac type resin, epoxy novolac resins from any other aldehyde such as, for example, acetaldehyde, chloraldehyde, butyaldehyde or fufuraldehyde, can also be used. Completely epoxidized novolacs or other epoxy novolacs which are only particularly epoxidized can be useful in this invention. An example of a suitable epoxy novolac is 2, 2, bis[p-(2-3-epoxypropoxy)-phenyl]-methane. Multi-functional epoxy resins are also useful epoxy resins in this invention. These resins are somewhat similar to epoxy novolacs, and can be mixtures of epoxy novolacs with bisphenol A or bisphenol F epoxides. These resins generally have extremely high temperature resistance and are commercially available as polyfunctional epoxy resins.

These bisphenol A, bisphenol F, novolac and multi-functional epoxy resins are widely commercially available and taught, for example, in the Smith et al. '018 patent. When bisphenol A, bisphenol F, novolac or multi-functional epoxies are desired, for example, to provide certain enhanced mechanical, tensile, or thermal stability properties, they will be blended with the cycloaliphatic resin. The term "epoxy resin component" is herein defined to mean cycloaliphatic epoxy resin alone, or in combination with one or more of such other epoxy resins previously described, not including epoxy diluents. Any blend should constitute at least 50 wt. % cycloaliphatic resin so that cure of the epoxy resin system is not sluggish. The term "epoxy system" is herein defined as such epoxy resin component plus reactive diluent.

There are only two phenolic accelerator compounds found useful in the particular insulating composition of this, invention, and they are catechol (1,2 benzene diol, $C_6H_4(OH)_2$) and pyrogallol (1, 2, 3, tri hydroxy benzene, $C_6H_3(OH)_3$). These phenolic accelerators can be used alone or in a mixture and are particularly effective when used in the range of 0.001 wt. % to 0.4 wt. % of the epoxy system weight (including reactive diluent). At accelerator concentrations over about 0.45 wt. %, the storage stability of the epoxy insulation resin definitely begins to be severely impaired. With high concentrations of organotin compounds the upper range of phenolic accelerator can drop to 0.2 wt % of epoxy system weight.

Results show that the selected phenolic acceleration effect is confined to only specific organotin latent catalyst compounds. Most organotin compounds do not show beneficial coreactivity properties with catechol and pyrogallol. This is probably because they do not form an intermediate reaction compound which is thought to be necessary for the initiation of the polymerization step. The useful latent catalysts for this particular resin system are covalently bonded organo-tin compounds having the general chemical structural formula:

$(R)_3SnX$ where each R is independently selected from the group consisting of phenyl, that is,

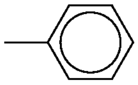

and alkaryl groups, such a benzyl groups,

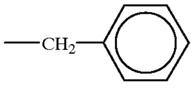

where the X constituent is selected from the group consisting of chloride, hydroxide and acetate. Examples of suitable tin chlorides are triphenyltin chloride ("TPTCL") and tribenzyltin chloride ("TBTCL"). Others are tribenzyltin hydroxide ("TBTH") and triphenyltin acetate ("TPTA"). These four organotin compounds can be used alone or in combination.

The useful organotin compound should be used in the range of 0.01 wt. % to 0.10 wt. % of epoxy system weight. These materials are highly reactive with mica and facilitate good bonding and interaction with mica tapes, as is discussed in detail by the Smith '183 patent. Organotin compounds which do not show coacceleration effect with catechol and pyrogallol are: tetrabutyltin (TBTN), tetraphenyltin (TPHT), bis(tri-n-butyltin oxide) (TBTO) and methyltin chloride (MTCI). In addition, the acceleration effect appears to be confined to catechol and pyrogallol. Other phenolic additives, such as resorcinol and straight bisphenol "A", will not accelerate cure in the presence of these organotin catalysts. This certainly demonstrates that not all phenolic accelerators or organotin compounds are equivalents.

The mechanism responsible for the coacceleration effect of catechol and pyrogallol with the "active" organotin compounds probably involves some type of charge-transfer complex formation between the accelerator and the organotin compound. This is shown by the formation of a deep-yellow coloration when both catechol (or pyrogallol) and the organotin compound are added to a cycloaliphatic epoxy resin. The coloration is absent when accelerator and organotin compound are added separately to the epoxy resin.

It is also interesting to speculate why catechol and pyrogallol are so specific as accelerators with organotin catalysts, whereas other phenolic materials, such as picric acid, resorcinol and bisphenol A, are not. The only common feature shown by catechol and pyrogallol is the presence of adjacent OH groups in the aromatic ring structure. The other phenolic compounds evaluated did not possess these adjacent OH groups. It may be that the adjoining OH groups might be necessary for the formation of a stable charge-transfer complex with the organotin compounds (probably by electron donation to the Sn atom). Attempts to make catechol/organotin complexes in the absence of epoxy resin (that is, in an inert solvent) have, so far, been unsuccessful. This suggests that the presence of cycloaliphatic epoxy molecules may be necessary to aid or stabilize complex formation between catechol and the organotin compound.

The insulating resins of this invention use the unique cure chemistry described previously to provide a "family" of cold-blendable, low-viscosity, epoxy resins suited for vacuum pressure impregnation applications in high voltage insulation. The viscosities obtainable with this family of resins (<100 cps), would appear to be adequate for efficient impregnation of the presently used mica tapes. These formulations will provide an alternative to the presently used styrene based epoxy resins. The preparation of these resins does not require special equipment or pre-cooking as is the case with styrene based epoxy resins, and the raw material components required to make the compositions are readily available from large company, multiple world-wide suppliers such as Shell, Ciba and Dow Chemical. Another advantage of these new VPI resin formulations is that no volatile vinyl monomers such as styrene and vinyl-toluene are needed to achieve low viscosity levels.

It should also be mentioned that epoxy resin flexibilizers such as aliphatic polyols, epoxidized polybutadienes, epoxidized oils such as linseed oil, and fillers such as alumina ($Al_2O_3$) and silica ($SiO_2$) can also be included without materially effecting the fundamental character of the insulating resin. While the term "consisting essentially of" has been used here and is taken to mean excluding materials of a different nature that would materially change the fundamental character of the insulating resin, the use of the further limiting term "consisting of" is reserved, consistent with U.S. practice.

One type of a closed full coil 10 which may be prepared using the VPI insulating resin of the present invention is illustrated in FIG. 1. The full coil comprises an end portion comprising a tangent 11, a connecting loop 12, and another tangent 13 with bare leads 14 extending therefrom. Straight slot portions 15 and 16 of the coil, usually are wrapped mica tape or possibly glass fiber cloth, which is then vacuum pressure impregnated with a resin, such as the insulating resin of this invention the slot portions 15 and 16 which have been hot pressed to form them to predetermined shape and size, are connected to the tangents 11 and 13 respectively. These slot portions are connected to other tangents 17 and 18 connected through another loop 19.

The complete full coils are placed within the slots of the stator or rotor of an electrical machine and the end windings are wrapped and tied together. The uninsulated leads are then soldered, welded or otherwise connected to each other or to the commutator. Thereafter, the entire machine will be placed in an oven and heated to a temperature effective to cure the completely reactive composition in the mica tape insulating the coil.

Figure 2:
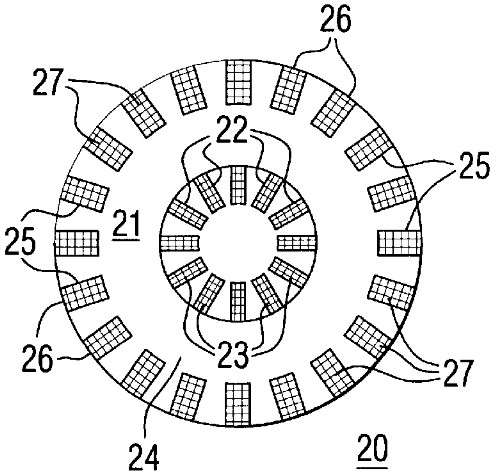
FIG. 2 is a cross-sectional view of a motor, containing coils insulated with the resinous composition of this invention.
Figure 3:
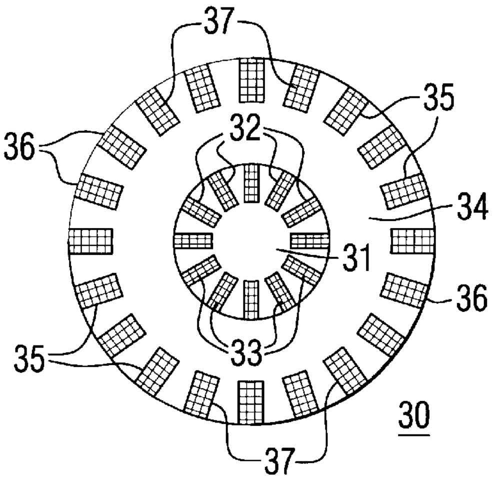
FIG. 3 is a cross-sectional view of a generator, containing coils insulated with the resinous composition of this invention.

FIG. 2 shows one embodiment of a motor 20 in cross section. The motor comprises a metal armature 21 having slots 22 therein, containing insulated coils 23, surrounded by a metal stator 24 having slots 25 therein about the stator circumference at 26. The stator slots contain insulated coils 27. All the insulation on the coils 23 and 27 can compose the resinous compositions of this invention. FIG. 3 shows one embodiment of a generator 30 in cross section. The generator comprises a metal rotor 31 having slots 32 therein, containing insulated coils, 33, surrounded by a metal stator 34 having slots 35 therein about the stator circumference at 36. The stator slots contain insulated coils 37 and may also contain inner cooling channels not shown. All the insulation on the coils 33 and 37 can comprise the resinous compositions of this invention.

The following specific examples are presented to help illustrate the invention. They should not be considered in any way limiting. They should not be considered in any way limiting.

EXAMPLE I

A series of insulating resins were formulated by cold-blending the epoxy resin component, a reactive epoxy diluent, an organotin catalyst and catechol phenolic accelerator.

Most of the work has been done using blends of a 3,4-epoxycyclohexylmethyl-3,4-epoxycyclohexane carboxylate cycloaliphatic epoxy sold commercially by Union Carbide Plastics Division under the Tradename, ERL 4221, also available from Ciba Products Co. as CY-179 and having an epoxy equivalent weight of about 133–140 and a viscosity at 25° C. of 350–450 centipoises, and the reactive diluent DGENPG (diglycidylether of neopentyl glycol), available from Shell Chemical Co. under the Tradename "Heloxy 68".

Gel time data were obtained with 10–20 g resin samples in aluminum dishes (5 cm. diam.) or with 5 g samples in small test tubes at 135° C. and 150° C. The latter test closely simulated the cure condition for the impregnate formulations in a silicate-rich environment. Catalyzed storage tests were carried out using a Gardner-Holdt bubble viscometer at 25° C. (ASTM D154-56). The "shelf-life" was measured by the time taken (at 25° C.) for the viscosity of the impregnate to reach 1000 cps. Some of these storage data were obtained by extrapolation of the viscosity curve to 1000 cps. Electrical properties were obtained on 0.32 cm.–0.64 cm. castings made with some of the formulations. Power factor (100×tan) and dielectric constant (∈) data were obtained at 150° C.

In many instances, comparisons are made of the properties of the insulating resin of this invention versus a longtime standard epoxy impregnating resin having outstanding gel, pot life and electrical insulating characteristics taught in. U.S. Pat. No. 4,254,351 (Smith et al.) hereinafter "Sample 351." Comparative Sample 351 is a solventless, bisphenol A, epoxy-styrene composition with an amine catalyst and also using maleic anhydride and a metal acetylacelonate latent accelerator. Comparative sample 351 was made by mixing: (1) the product of the reaction of (a) 1 part of an epoxy resin mixture, comprising solid epoxy resin and liquid epoxy resin wherein the weight ratio of solid epoxy: liquid epoxy is between 1:1 to 1:10; with (b) between about 0.01 part to 0.06 part of maleic anhydride and (c) a catalyst; under such conditions that the epoxy diester formed has an acid number of between about 0.5 to 3.0; with (2) styrene; and between about 0.0003 part to 0.004 part of a room temperature stabilizer (3) between about 0.3 part to 1.2 part of a polycarboxylic anhydride, which is soluble in the mixture of (1) and (2) and an amount of free radical catalyst that is effective to provide a catalytic effect on the impregnating varnish and to cure it at temperatures of over about 85° C., and with (4) between 0.0005 part to 0.005 part of a metal acetylacetonate, of chromium (III) acetylacetonate, manganese (III) acetylacetonate acting as latent accelerator. As can be seen, this is a rather complicated admixture compared to insulating resin of this invention.

Table 1 gives a list of different compositions evaluated, samples 1–7 and comparative samples C1, C2 and 351, showing viscosity, gel time and storage stability data.

TABLE 1

THE EFFECT OF VARIOUS AMOUNTS OF DGENPG AND TRIPHENYLTIN ACETATE (TPTA) CATALYST/CATECHOL ACCELERATOR ON THE VISCOSITY, GEL TIME AND STORAGE STABILITY OF CYCLOALIPHATIC EPOXY IMPREGNANTS

| Impregraant Sample No. | Cycloaliphatic Epoxy (parts)[a] | Epoxy Diluent[b] (parts) | Organotin Catalyst (parts) | Catechol (parts) | Viscosity at 25° C. (cps.) initial | 8 weeks | Gel Time[c] at 150° C. (min) | Storage[d] Stability at 25° C. |
|---|---|---|---|---|---|---|---|---|
| 1 | 50 | 50 | 0.10 TPTA | 0.10 | 41 | 55 | 40–50 | >6 mos |
| 2 | 40 | 60 | 0.10 TPA | 0.10 | 27 | 40 | >100 | >6 mos |
| 3 | 50 | 50 | 0.10 TPA | 0.20 | 41 | 200 | 20–25 | 21 wks |
| 4 | 40 | 60 | 0.10 TPA | 0.20 | 27 | 90 | 30–35 | 39 wks |
| 5 | 65 | 35 | 0.10 TPTA | 0.10 | 57 | 140 | <20 | >24 wks |
| 6 | 60 | 40 | 0.10 TPA | 0.20 | 50 | 380 | <15 | 23 wks |
| 7 | 55 | 45 | 0.10 TPA | 0.20 | 41 | 430 | <15 | 20 wks |
| C1 | 45 | 55 | 0.10 TPA | 0.50 | 32 | >1000 | <10 | <7 wks |
| C2 | 45 | 55 | 0.20 TPTA | 0.20 | 32 | >1000 | 10–20 | <7 wks |
| 351 | — | — | — | — | 10 | 15 | — | >6 mos |

[a]Using ERL 4221 (3,4-epoxy cyclohexyl-methyl-3,4-epoxy cyclohexane carboxylate).
[b]Using diglycidylether of neopentyl glycol (DGENPG).
[c]20 g sample cured in 5 cm. diam. aluminum dish (covered with a watch-glass).
[d]Time for viscosity to reach 1000 cps. at 25° C.

The most preferred composition shown in Table 1 is an insulating resin containing 55 wt. % to 65 wt. % of epoxy diluent and 0.05 wt. % to 0.15 wt. % each of organotin and phenolic accelerator.

As can be seen, the viscosity of the insulating resin of this invention starts to increase dramatically at about 35 wt. % diluent, so that the lower range of diluent is estimated to be about 30 wt. % of the epoxy system weight. Also, a storage stability of at least 4 months is realistically required for insulating resin to be considered commercially viable in many countries. Comparative samples C1 and C2 provide poor shelf life compositions due to either high organotin concentration or a combination of high total organotin plus phenolic accelerator concentration. Useful upper limits for the organotin latent catalyst appear to be up to 0.1 wt. % of epoxy system weight. Useful upper limits for the phenolic accelerator appear to be up to 0.4 wt. % of epoxy system weight. All the gel times were acceptable except for C1. Commercial requirements would require some time before impregnation and gellation, usually over 10 minutes up to about 2 hours.

The correlation between gel times and tribenzyltin chloride concentration as well as the correlation between gel times and catechol concentration is shown in Table 2:

TABLE 2

| Impregnant Sample No. | Cycloaliphatic Epoxy (parts)[a] | Epoxy Diluent (parts)[b] | Organotin Catalyst (parts) | Catechol (parts) | Gel Time[c] at 150° (min) |
|---|---|---|---|---|---|
| 8 | 50 | 50 | 0.10 TBTCL | 0.10 | 15 |
| 9 | 50 | 50 | 0.05 TBTCL | 0.10 | 35 |
| 10 | 50 | 50 | 0.01 TBTCL | 0.10 | 70 |
| 11 | 50 | 50 | 0.10 TBTCL | 0.005 | 80 |
| 12 | 50 | 50 | 0.10 TBTCL | 0.001 | 110 |

[a]Using ERL 4221
[b]Using DGENPG
[a]20 g Sample cured in 5 cm. diam. aluminum dish (covered with a watch-glass).

All gel times were acceptable, that is over 10 minutes up to 2 hours, as mentioned previously. Useful lower limits for the phenolic accelerator appear to be 0.001 wt. % when used with a substantial amount of TBTCL, but would preferably appear to be 0.010 wt. %. Useful lower limits for the organotin latent catalyst appear to be 0.01 when used with a substantial amount of phenolic accelerator, but would preferably appear to be 0.05 wt. %. Both the selected phenolic accelerator and the organotin catalyst must be present in the insulating resin.

Electrical properties (100×tan δ and dielectric constant values) for several cured resin samples were taken and are shown in Table 3 and compared to Sample 351, which has excellent electrical properties.

TABLE 3

ELECTRICAL PROPERTIES OF CURED SAMPLES OF CYCLOALIPHATIC EPOXY IMPREGNANTS CONTAINING ORGANOTIN CATALYST AND CATECHOL ACCELERATOR

| Impregnant Sample No. | Sample Thickness (cm.) | Cure | Electrical Properties at 150° C. 100 × tan δ | ε. |
|---|---|---|---|---|
| 5 | .353 | 16h at 100° C. + 8h at 150° C. | 2.1 | 5.6 |
| 6a | .695 | 16h at 100° C. + 8h at 150° C. | 17.0 | 6.7 |
| 7b | .622 | 16h at 100° C. + 8h at 150° C. | 42.0 | 6.9 |
| 351c | .706 | 16h at 100° C. + 8h at 150° C. | 6.8 | 4.3 |

[a]Same composition as 6 except 0.10 part catechol.
[b]Same composition as 7 except 0.10 part catechol.
[c]Contains 0.1% chromium acetylacetonate.

Sample 5 had an even better (lower) 100×tan δ value than Sample 351c at 150° C. While the electrical properties of both 6a and 7b are acceptable at 150° C. cure, there is a strong indication that they would have had lower values if the post cure temperature had been raised to 160° C.

Although the initial formulations employ cycloaliphatic epoxy and epoxy reactive diluent in their preparation, it is envisioned that modification with other reactive epoxy components, such as bisphenol "A" epoxy, bisphenol "F" epoxy, epoxy-novolacs and multi-functional epoxy can be easily carried out to give enhanced mechanical, tensile and thermal stability properties if required. Also, the other organotin compounds as well as pyrogallol would provide equally good results when used in the wt. % ranges previously described.

Also, as mentioned previously, organotin compounds which do not show coacceleration effect with catechol and pyrogallol are tetrabutyltin (TBTN), Tetraphenyltin (TPHT), bis(tri-n-butyltin oxide) (TBTO), and methyltin chloride (MTC1). In addition, the acceleration effect appears to be confined to catechol and pyrogallol. Other phenolic additives, such as resorcinol and straight bisphenol "A", will not accelerate cure in the presence of these organotin catalysts as shown by the data in Table 4.

The data in Table 4 shows the effect of various potential accelerators on the gel time of a cycloaliphatic epoxy formulation containing tribenzyltin chloride catalyst. It is noted that, in the silicate-rich environment (that is, glass test tube), only catechol and pyrogallol showed useful acceleration effects at concentrations up to 0.10%. Trifluoroacetic acid caused some "popcorn" gelation at room temperature. It should also be noted that phenolic accelerators such as picric acid, bisphenol 'A' and resorcinol did not exhibit any significant acceleration effect with tribenzyltin chloride catalyst.

TABLE 4

THE EFFECT OF VARIOUS ACCELERATORS ON THE GEL TIME OF CYCLOALIPHATIC EPOXY IMPREGNANT CONTAINING TRIBENZYLTIN CHLORIDE (TBTCl) CATALYST

| Cycloaliphatic Epoxy (parts)[a] | Epoxy Diluent[b] (parts) | TBTCL Organotin Catalyst (parts) | Accelerator Added (parts) | Gel Time[c] at 150° C. (min) |
|---|---|---|---|---|
| 70 | 30 | 0.10 TBTCl | None | 120–135 |
| " | " | " | 1.0 Acetic Acid | 120–135 |
| " | " | " | 1.0 Hexanoic Acid | 105–120 |

TABLE 4-continued

THE EFFECT OF VARIOUS ACCELERATORS ON THE GEL TIME OF CYCLOALIPHATIC EPOXY IMPREGNANT CONTAINING TRIBENZYLTIN CHLORIDE (TBTCl) CATALYST

| Cycloaliphatic Epoxy (parts)[a] | Epoxy Diluent[b] (parts) | TBTCL Organotin Catalyst (parts) | Accelerator Added (parts) | Gel Time[c] at 150° C. (min) |
|---|---|---|---|---|
| " | " | " | 1.0 Trifluorocetic Acid | d |
| " | " | " | 0.1 Catechol | 15–30 |
| " | " | " | 1.0 Acetylacetone | >1000 |
| " | " | " | 1.0 Ethylene Glycol | 210–240 |
| " | " | " | 1.0 Trifluoroacetic Anhydride | 105–120 |
| " | " | " | 0.01 Benzoquinone | 120–135 |
| " | " | " | 0.01 Pyrogallol | 60–70 |
| " | " | " | 0.01 Bisphenol 'A' | >85 |
| " | " | " | 0.01 Picric Acid | >70 |
| " | " | " | 0.01 Resorcinol | >85 |
| " | " | " | 0.10 Pyrogallol | <15 |
| " | " | " | 0.10 Bisphenol 'A' | >90 |
| " | " | " | 0.10 Resorcinol | 75–90 |

[a]Using ERL 4221 (3,4-epoxy cyclohexyl-methyl-3,4-epoxy cyclohexane carboxylate).
[b]Using diglycidylether of neopentyl glycol (DGENPG).
[c]Measured (5 g) in glass test tube in oven.
[d]Some gelation occurred at room temperature.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which, is to be given the full breadth of the claims appended and any and all equivalents thereof.

What is claimed is:

1. An insulating resin consisting of:

(1) an epoxy system consisting of:

(a) an epoxy resin component consisting of a blend of cycloaliphatic epoxy and an epoxy resin selected from the group consisting of bisphenol A epoxy, bisphenol F epoxy, epoxy novolac, and mixtures thereof, where the cycloaliphatic epoxy constitutes at least 50 wt. % of the blend, and (b) a diglycidylether of neopentyl glycol epoxy reactive diluent, where the epoxy reactive diluent constitutes from 30 wt. % to 70 wt. % of the epoxy system, (2) a phenolic accelerator selected from the group consisting of catechol, pyrogallol, and mixtures thereof, where the phenolic accelerator concentration is from 0.001 wt. % to 0.4 wt. % and (3) an organotin latent catalyst selected from the group consisting of triphenyltin chloride, tribenzyltin chloride, tribenzyltin hydroxide, triphenyltin acetate, and mixtures thereof, where the organotin latent catalyst concentration is from 0.01 wt. % to 0.1 wt. % based on the epoxy system, and where the insulating resin is solventless and has a viscosity of from 10 centipoise to 450 centipoise at 25° C.

2. The insulating resin of claim 1, where the resin has a storage stability at 25° C. of over 4 months.

3. The insulating resin of claim 1, where the epoxy reactive diluent constitutes from 55 wt. % to 65 wt. % of the epoxy system and where both the organotin latent catalyst concentration and the phenolic accelerator concentration is from 0.05 wt. % to 0.15 wt. % based on the epoxy system.

4. The insulating resin of claim 1, where the organotin latent catalysts are capable of forming an charge-transfer complex with the phenolic accelerator necessary for a coacceleration effect and initiation of polymerization of the insulating resin.

* * * * *